(12) United States Patent
Manuel (10) Patent No.: US 11,465,335 B2
(45) Date of Patent: Oct. 11, 2022

(54) FILAMENT CUTTER

(71) Applicant: Arevo, Inc., Santa Clara, CA (US)

(72) Inventor: Steven George Manuel, San Mateo, CA (US)

(73) Assignee: Arevo, Inc., Milpitas, CA (US)

( * ) Notice: Subject to any disclaimer, the term of this patent is extended or adjusted under 35 U.S.C. 154(b) by 366 days.

(21) Appl. No.: 16/023,197

(22) Filed: Jun. 29, 2018

(65) Prior Publication Data

US 2020/0001522 A1  Jan. 2, 2020

(51) Int. Cl.
| | | |
|---|---|---|
| *B29C 64/118* | (2017.01) | |
| *B29C 64/209* | (2017.01) | |
| *B29C 64/218* | (2017.01) | |
| *B33Y 10/00* | (2015.01) | |
| *B33Y 40/00* | (2020.01) | |
| *B33Y 30/00* | (2015.01) | |

(52) U.S. Cl.
CPC .......... *B29C 64/118* (2017.08); *B29C 64/209* (2017.08); *B29C 64/218* (2017.08); *B29C 2793/0027* (2013.01); *B33Y 10/00* (2014.12); *B33Y 30/00* (2014.12); *B33Y 40/00* (2014.12)

(58) Field of Classification Search
CPC .......... B29C 2793/0027; B29C 64/118; B29C 64/209; B29C 64/218; B29C 70/384; B33Y 40/00; B33Y 10/00; B33Y 30/00
See application file for complete search history.

(56) References Cited

U.S. PATENT DOCUMENTS

| | | | |
|---|---|---|---|
| 9,126,367 B1* | 9/2015 | Mark | B29C 70/20 |
| 10,254,499 B1* | 4/2019 | Cohen | B23K 26/342 |
| 2002/0019683 A1* | 2/2002 | White | B33Y 30/00 |
| | | | 700/255 |
| 2015/0035206 A1* | 2/2015 | Maggiore | B29C 64/364 |
| | | | 264/401 |
| 2018/0098862 A1* | 4/2018 | Kuiken | A61F 2/583 |

* cited by examiner

*Primary Examiner* — Philip C Tucker
*Assistant Examiner* — Evan T Hulting
(74) *Attorney, Agent, or Firm* — Harris A Wolin; Kenneth Ottesen (57) ABSTRACT

A cutting assembly and a cutter are provided, wherein, in an apparatus for additive manufacturing with a filament, a deposition head has a body and an applicator for fixing a run of filament to a surface at a deposition location ending at a deposition termination point. The cutter assembly has a fixation element for fixing the cutter assembly relative to the deposition head, and a cutter movable relative to the fixation element. The deposition head has a deposition termination configuration and a cutting configuration, and after fixing the run of filament, the deposition head transitions from the deposition termination configuration to the cutting configuration. The cutter cuts the filament only when the deposition head is in the cutting configuration.

14 Claims, 8 Drawing Sheets

FILAMENT CUTTER

FIELD OF THE INVENTION

The present invention relates to additive manufacturing of three-dimensional articles in general, and, more particularly, to a filament cutter assembly and method for cutting a thermoplastic filament at the conclusion of fixing a run of filament to an object being manufactured.

BACKGROUND

In general, there are two complementary approaches to manufacturing an object: additive manufacturing and subtractive manufacturing.

Additive manufacturing involves aggregating material to form the desired object. In contrast, subtractive manufacturing involves removing material to form the desired object. In practice, many objects are manufactured using a combination of additive and subtractive techniques.

A form of additive manufacturing—colloquially known as "three-dimensional (3D) printing"—is the subject of intense research and development because it enables objects with complex geometries to be manufactured without molds or dies, although molds or dies may be used to support the manufacturing process in some cases. Furthermore, 3D printing enables the mass customization of objects with different dimensions and characteristics.

In at least one 3D printing technique, the object is built by providing a thermoplastic filament to a deposition head on a robotic arm. The thermoplastic filament comprises a continuous tow of carbon fibers that is impregnated with thermoplastic. The deposition head heats and deposits the thermoplastic filament as one or more runs of material, via an applicator, such as a roller. After it is deposited, each run quickly solidifies and fuses with the runs that it touches. The technique thereby builds a three-dimensional object from a mathematical model of the object.

In order to build the object within tolerances specified in the model, the deposition head must be able to end a run of material at a location specified by the model while still fixing the end of the run of material accurately and consistently. As the thermoplastic filament is typically provided as a continuous filament, such as a filament drawn from a spool, this requires cutting at a specified location along the filament. Existing implementations may provide a cutting block at or as part of the deposition head and may cut the continuous filament as it passes through the deposition head and prior to the application of the run of material to the object. While this approach provides the ability to cut the run of filament at the desired location, it requires disconnecting the run of material from the continuous filament prior to application, which can lead to a variety of problems.

For example, cutting the filament prior to application results in an unrestrained segment of filament and a loss of tension at the deposition head, making the filament difficult to control. If the deposition head or a filament guide does not grip the filament after the cutting block and the filament is cut prior to application, the filament may fall away from the applicator before the applicator places the run of filament in position. For example, where the applicator is a roller, the filament may fall away from a line that the run of filament was intended to follow. Further, the application of the filament may rely on precise heating of the filament, which may be by a laser directed at the filament while the filament is in a guide at the deposition head. If the deposition head does not grip the filament after the cutting block, and/or tension is lost after cutting, the location of the filament prior to application may not be as precisely known, and the heating element may therefore be unable to accurately and precisely heat the filament.

Further, a loss of tension in the filament prior to application of that segment of filament to the object may result in different physical characteristics in the segment of filament fixed to the object after the cut is made.

What is needed is a system or assembly for cutting a continuous filament during application of a run of filament such that the filament is cut at the termination of a run of material but control of the filament is maintained throughout the application process.

SUMMARY

The present invention enables an additive manufacturing system or assembly, such as a deposition head for an additive manufacturing system, to cut a thermoplastic filament after fixing the filament to a surface, such as a surface of an object being manufactured. In particular, the cutter and cutter assembly described herein allows such a system to cut a filament at a surface after the filament is fixed to that surface, rather than within a deposition head before the filament is applied.

Cutting at the surface after fixing the filament allows the deposition head to maintain tension in the filament during the entire deposition process, thereby maintaining control and consistency required for parts requiring high tolerances.

In the additive manufacturing apparatus and system described herein, the apparatus comprises a deposition head having a body and an applicator, such as a roller, for fixing a run of filament to a surface, which may be flat or curved. The run of material is fixed by the applicator at a deposition location comprising a series of deposition points and ending at a deposition termination point. The deposition termination point is, by definition, adjacent to and below the applicator upon conclusion of applying the run of filament.

Where the applicator is a roller, the applicator may fix the filament to the deposition location by compressing the run of filament against the surface along a length of the deposition location. In such a scenario, the segment of the filament applied by the applicator will have a flattened, or linear, cross section after being fixed to the surface.

The deposition head is provided with a cutter assembly for cutting the filament after the run of filament is fixed to the surface by the applicator. The cutter assembly in turn comprises a fixation element for fixing the cutter assembly relative to the deposition head and a cutter, such as a hinged clipper, that moves relative to the fixation element. The cutter may move along a track, or it may be connected to the fixation element by a robotic arm or the like, or it may be a separate robot provided next to the robot having the deposition head.

The deposition head has a first configuration, referred to as a deposition termination configuration, in which the cutter is further than the applicator from the deposition termination point. The deposition head is in the deposition termination configuration during application of the filament up until the termination of such deposition. The deposition head also has a second configuration, referred to as a cutting configuration, in which the cutter is closer than the applicator to the deposition termination point. The two configurations may differ in the positioning of cutter relative to the applicator as well as in the positioning of the deposition head relative to the surface.

During use, after conclusion of fixing the run of filament to the surface, the deposition head transitions from the deposition termination configuration to the cutting configuration the cutter cuts the filament at or near the deposition termination point. In such an embodiment, the cutter cuts the filament only when the deposition head is in the cutting configuration.

In some embodiments, while transitioning to the cutting configuration, the deposition head provides excess filament as slack, such that upon moving the applicator away from the deposition termination point, the run of filament is not pulled away from the surface. Accordingly, the excess filament extends from the deposition termination point to the applicator. In such an embodiment, the deposition head includes a retractor, such that after cutting the filament, the excess filament is drawn back into the deposition head.

In some embodiments, the fixation element of the cutter assembly may be located adjacent the applicator, so that when the deposition head is transitioned to the cutting configuration, both the cutter and the applicator are translated together, such that the applicator is above the deposition termination point prior to the transition and the cutter is above the deposition termination point after the transition.

As noted above, when the applicator is a roller, the segment of the filament applied by the applicator will be flattened. In contrast, a second segment of the filament not flattened as part of the run of filament, such as the excess filament discussed above, may have a substantially circular cross section after fixing the run of filament. The cutter may thereby cut the filament at the end of the segment of the filament that has been flattened.

The filament may further have a transitional segment between the flattened segment of filament and the second segment of filament. In some embodiments, the cutter may cut the filament twice, applying a first cut between the flattened segment of filament and the transitional segment and applying a second cut between the transitional segment and the second segment of filament.

In some embodiments, the cutter may be provided with two cutting mechanisms, and may thereby make both the first cut and the second cut simultaneously.

The cutter assembly may further comprise an actuator, and the actuator and the cutter may both be fixed to a sled movable relative to the fixation element. Alternatively, the actuator may be mounted elsewhere on the deposition head, and may be connected to the cutter assembly by, for example, a Bowden cable.

The cutter may have at least one blade retained parallel to the surface during the cutting process. Accordingly, when the run of filament is fixed to the surface, and an excess filament segment extends away from the surface towards the applicator, the cutter cuts the filament where the filament is pulled away from the surface. Alternatively, the cutter may be angled, or adjustable, relative to the surface to ease an approach to narrower spaces, such as concave spaces. The cutter may be two blades cutting against each other, or it may be a single blade cutting the filament against an anvil.

In some embodiments, the cutter assembly is a cutter fixed relative to the deposition head and consistently targeting the deposition point adjacent the applicator. In such an embodiment, the cutter is configured for cutting the filament at the deposition termination point after the applicator fixes the filament to the surface. Such a cutter may cut the filament from a short distance, such as by using a laser cutter or an ultrasonic blade targeting the deposition termination point.

In use, the apparatus disclosed herein proceeds by heating a filament segment corresponding to the run of filament at the deposition head, and the deposition head then uses the applicator to fix the run of filament to deposition location on the surface, ending at the deposition termination point. The applicator is then transitioned from the deposition termination configuration to the cutting configuration by removing the applicator from the deposition termination point and moving the cutter relative to the fixation element.

After fixing the run of heated filament to the deposition location, the apparatus may cool the filament by applying air or fluid with a cooling nozzle located near the applicator.

Once in the cutting configuration, the cutter then cuts the heated filament segment, separating the run of filament from a second filament segment. The deposition head then retracts the second filament segment into the deposition head.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The filament cutter assemblies of the illustrative embodiments are described in this specification in the context of cutting a thermoplastic filament after deposition of a run of material, generally a run of filament, by a deposition head in an additive manufacturing system. As those who are skilled in the art will appreciate, however, after reading this specification, the disclosed cutter and cutter assembly can be used in various other applications, and with either filaments or other slender threadlike objects or fibers. For example and without limitation, the cutter assembly described may be usable in a 3-D knitting machine.

Figure 1:
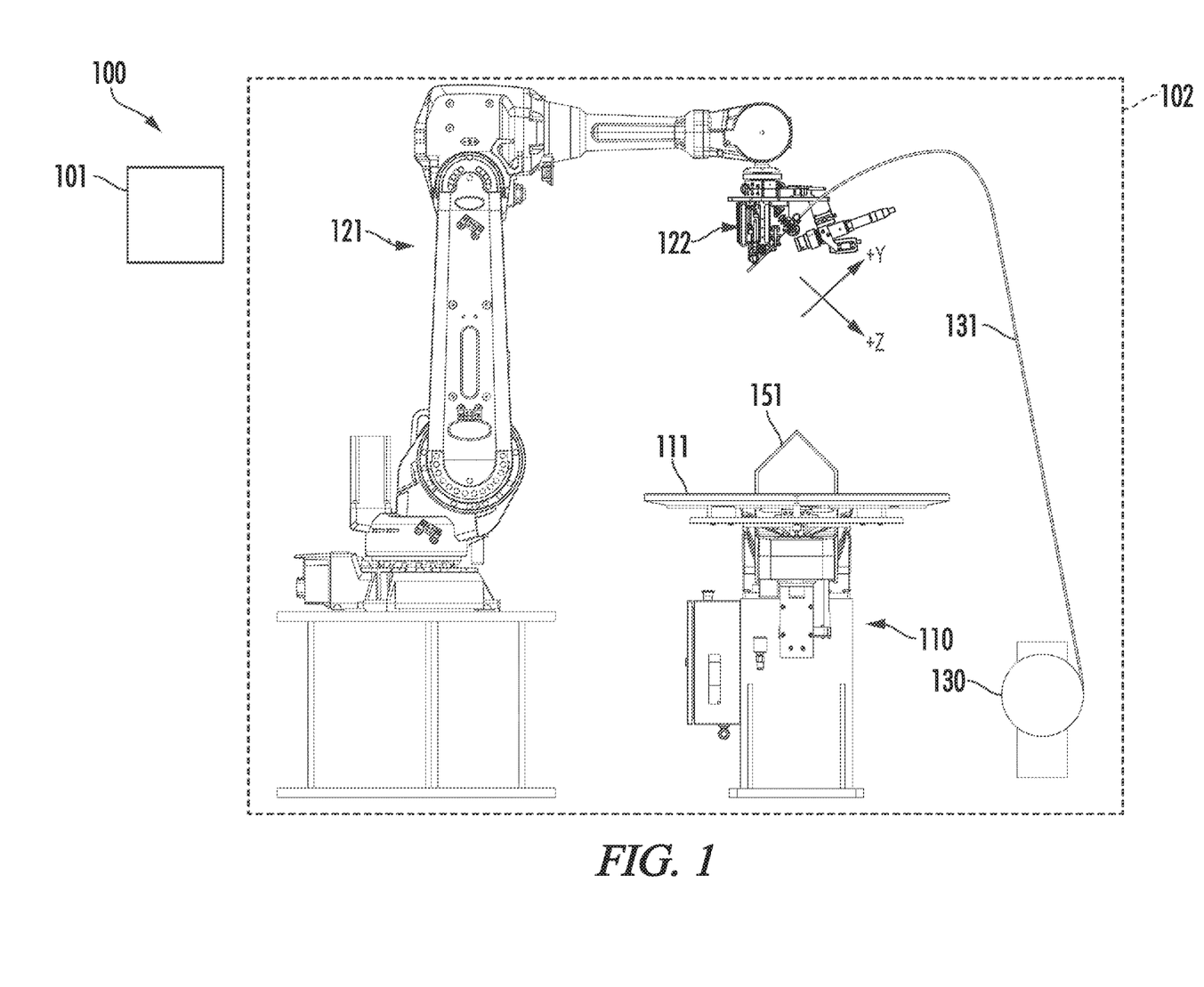
FIG. 1 depicts an illustration of the salient components of additive manufacturing system 100 in accordance with the illustrative embodiments of the present invention.

FIG. 1 depicts an illustration of the salient components of additive manufacturing system 100 in accordance with the illustrative embodiment of the present invention. Additive manufacturing system 100 comprises: controller 101, build chamber 102, turntable 110, deposition platform 111, robot 121, deposition head 122, filament source 130, and thermoplastic filament 131. A purpose of manufacturing system 100 is to manufacture object 151, which is an article of manufacture or an apparatus.

Controller 101 comprises the hardware and software necessary to direct build chamber 102, robot 121, deposition head 122, and turntable 110, in order to manufacture object 151. The controller also directs at least some of the components that are part of deposition head 122, and may control components of the filament cutter assembly 210 described below. Controller 101 comprises computer-aided design/computer-aided manufacturing (CAD/CAM) functionality in order to control the aforementioned components. It will be clear to those skilled in the art, after reading this disclosure, how to make and use controller 101.

Build chamber 102 may be a thermally-insulated, temperature-controlled environment in which object 151 is manufactured. It will be clear to those skilled in art how to make and use build chamber 102, and it will be understood that such a thermally insulated build chamber is not critical for manufacturing the object 151.

Turntable 110 comprises a motor, which may be a stepper motor, under the control of controller 101 that is capable of rotating platform 111 (and, consequently object 151) around an axis of rotation. In particular, turntable 110 is capable of:
  i. rotating platform 111 clockwise around the axis of rotation from any angle to any angle, and
  ii. rotating platform 111 counter-clockwise around the axis of rotation from any angle to any angle, and
  iii. rotating platform 111 at any rate, and
  iv. maintaining (statically) the position of platform 111 at any angle.

In some embodiments of the present invention, turntable 110 is further capable of being positioned in general (i.e., not being limited to rotation around the aforementioned axis), under the control of controller 101, and accordingly is sometimes referred to as a "build plate positioner." It will be clear to those skilled in the art how to make and use turntable 110.

Platform 111 comprises hardware on which object 151 is manufactured. Platform 111 is configured to receive heated filament deposited by deposition head 122. In some embodiments, platform 111 is referred to as a "build plate."

As those who are skilled in the art will appreciate, platform 111 need not be coupled to a turntable, in order for it to receive the heated filament. In any event, it will be clear to those skilled in the art how to make and use platform 111.

Robot 121 may be capable of depositing a run of material from any three-dimensional coordinate in build chamber 102 to any other three-dimensional coordinate in build chamber 102 with deposition head 122 at any approach angle. To this end, robot 121 comprises a multi-axis (e.g., six-axis, seven-axis, etc.), mechanical arm under the control of controller 101. A non-limiting example of robot 121 is the IRB 4600 robot offered by ABB. It will be clear to those skilled in the art how to make and use robot 121, and that for many purposes, a robot with narrower capabilities and additional constraints may still benefit from the embodiments of the cutter assembly disclosed herein.

Deposition head 122 comprises hardware that is under the control of controller 101 and that deposits filament 131, which may partially or wholly contain one or more fiber strands. Deposition head 122 is an example of an "end effector" in relation to robot 121, being attached to robot 121 at the robot's wrist.

Thermoplastic filament 131 may comprise a cylindrical towpreg of continuous 12K carbon fiber that is impregnated with a thermoplastic. In some alternative embodiments, filament 131 is impregnated with something other than, or in addition to, a thermoplastic. It will be clear to those skilled in the art, after reading this disclosure, how to make and use alternative embodiments of the present invention in which thermoplastic filament 131 has a different fiber composition, such as one described in U.S. patent application Ser. No. 14/184,010, which is incorporated by reference herein.

Although not shown, in some embodiments, the path that the filament 131 takes from the filament source 130 to the filament accumulator and the path it takes from the filament accumulator to the deposition head may be enclosed in tubing. Such tubing may be used to control the environment within which the filament 131 is provided, such as to shield the filament from ambient moisture, which might otherwise be absorbed by the filament. Such tubing may also be used to prevent motion of the robot 121 from impacting the filament directly. In such a scenario, the load may be borne by the tubing itself. Further, such tubing may be oversized and may be made of a slippery material so as to reduce any friction between such tubing and the filament 131.

Thermoplastic filament 131 is deposited as a "run of material" onto object 151 or platform 111, or both. For purposes of clarity, filament 131 is depicted in FIG. 1 as being separate from object 151. The particular shape of object 151 as depicted has been selected for pedagogical purposes; however, additive manufacturing system 100 is capable of building any of a variety of objects.

Figure 2:
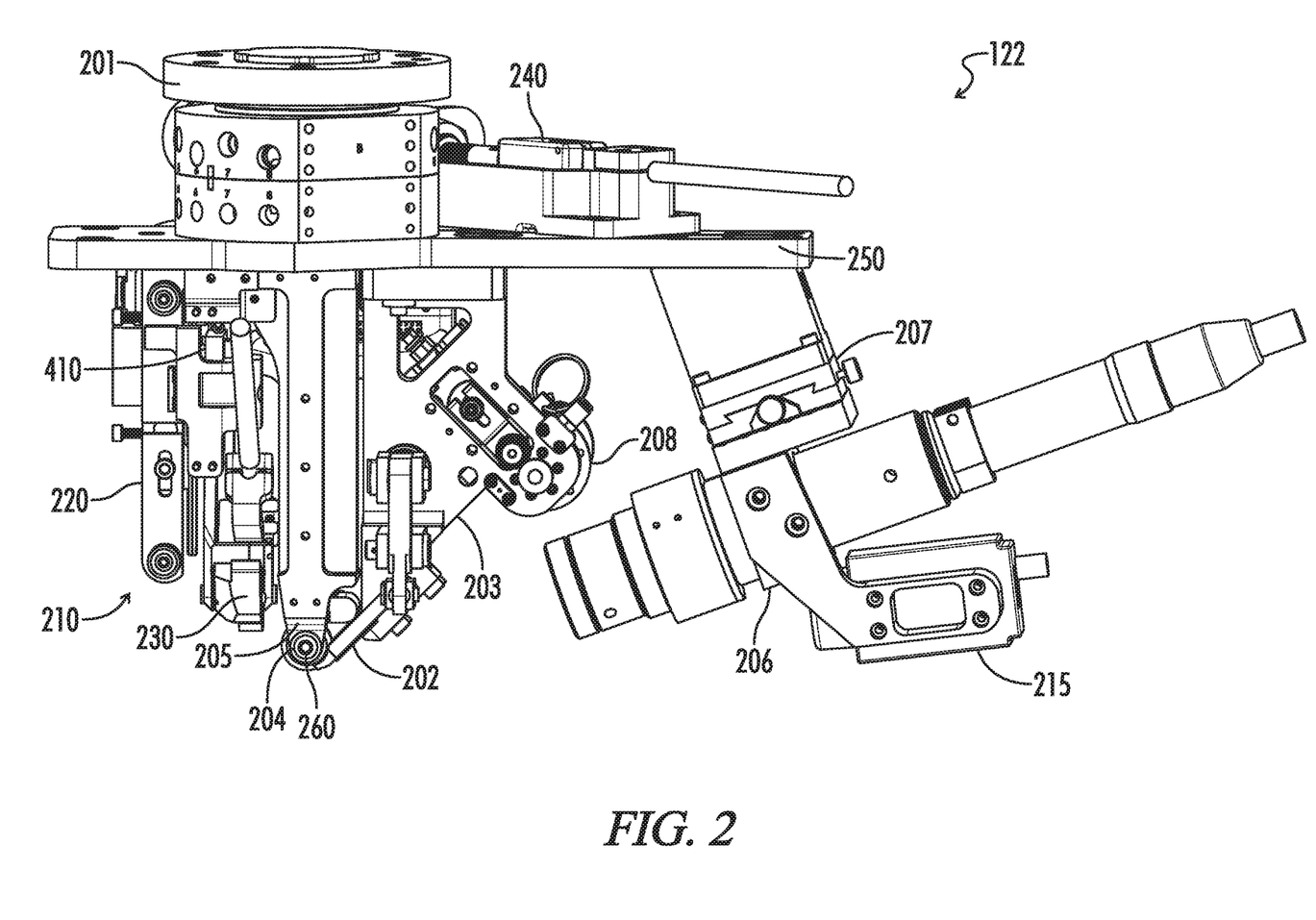
FIG. 2 depicts a deposition head 122 for use with the additive manufacturing system 100 of FIG. 1.

FIG. 2 depicts an illustration of deposition head 122. Deposition head 122 comprises: mount 201, filament guide 202, filament guide support 203, applicator 204, shown as and sometimes referred to herein as a roller, deposition head body 205, heat source 206, heat source support 207, filament drive 208, cutter assembly 210, and actuator 240 interconnected as shown. As those who are skilled in the art will appreciate after reading this specification, one or more of the elements that are depicted as being part of deposition head 122 can instead be part of robot 121 or a different part of additive manufacturing system 100.

Mount 201 of deposition head 122 comprises one or more parts that are configured to mount the various components of deposition head 122 to the arm of robot 121. The mount may include an extended mount plate 250 which may be used to mount components of the deposition head 122 relative to each other.

Filament guide 202 is configured to guide filament 131 provided by filament source 130, toward deposition surface 310 at a deposition location 340. The deposition location is a sequence of deposition points 320 ending at deposition termination point 330 (depicted in FIG. 3), in accordance with the illustrative embodiment. Filament guide 202 comprises a plate through which filament 131 can be heated by the heat source 206. The filament guide is attached to mount 201 via support 203.

Applicator, or roller 204, is attached to mount 201 or mount plate 250 via body 205 and, in the case of a roller, is rotatably coupled to body 205.

Heat source 206 is a heating device configured to heat filament 131 while the filament is moving through guide 202. Heat source 206 comprises a laser, configured to emit electromagnetic radiation in the form of infrared light. In some alternative embodiments of the present invention, the laser emits electromagnetic radiation in a different form, while in some other embodiments heat source 206 uses a heat source other than a laser, or emits thermal energy that which might be in a form other than electromagnetic radiation, or both. The heat source targets the filament 131 as it passes through the deposition head 122 at a point prior to it passing the applicator 204, such as in the guide 202, so that it is heated prior to being deposited.

Accordingly, the particular source of the heat is sufficient to heat the thermoplastic in a portion of filament 131 prior to the portion reaching deposition point 320. When heated in this way by heat source 206, the thermoplastic in the filament 131 becomes pliable and adhesive, and can be pressed and deposited by roller 204. The heat source 206 is configured to produce a temperature at filament 131 that is high enough to make the thermoplastic pliable and adhesive, but not too high. If the thermoplastic is too cool, it is not sufficiently pliable or adhesive, and if the thermoplastic is too hot, it melts and its viscosity becomes too low. When filament 131 is moving continuously, heat source 206 heats a continuum of affected portions of the filament which combine to form the run of material applied to the consecutive deposition points 320 comprising the deposition location 340.

Heat source 206, including the laser, is controlled by controller 101. The heat source 206 may be provided with a thermal camera 215 for measuring a temperature of the filament. The thermal camera 215 may provide data to the controller 101 for use in controlling the heat source 206. The heat source is attached to mount 201 via support 207.

Filament drive 208 is configured to feed filament 131 at a feed velocity controlled by controller 101. Drive 208 feeds the filament forward, in particular toward and through filament guide 202. The feed velocity is important in regard to design considerations of filament guide 202 as described below, as well as in regard to other reasons. In some embodiments of the present invention, drive 208 is attached to mount 201 via its own support member. In some implementations, as discussed below, the filament drive 208 may be operable in reverse to retract filament from a deposition location through the filament guide 202 and towards the deposition head 122.

Figure 4A:
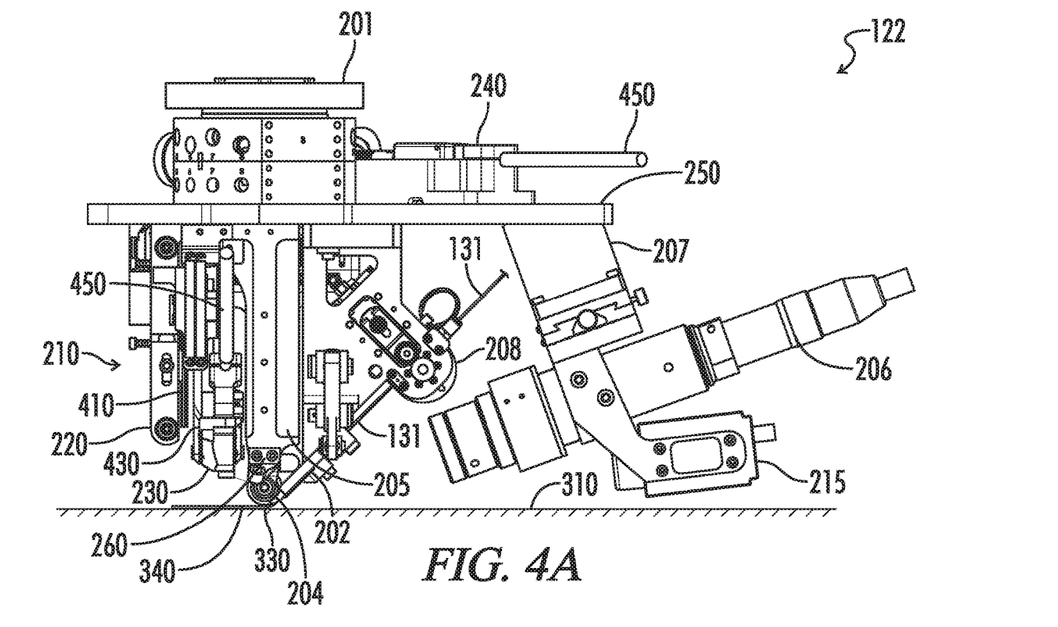
FIGS. 4A and 4B depict the deposition head 122 in a first configuration and in a second configuration respectively.
Figure 4B:
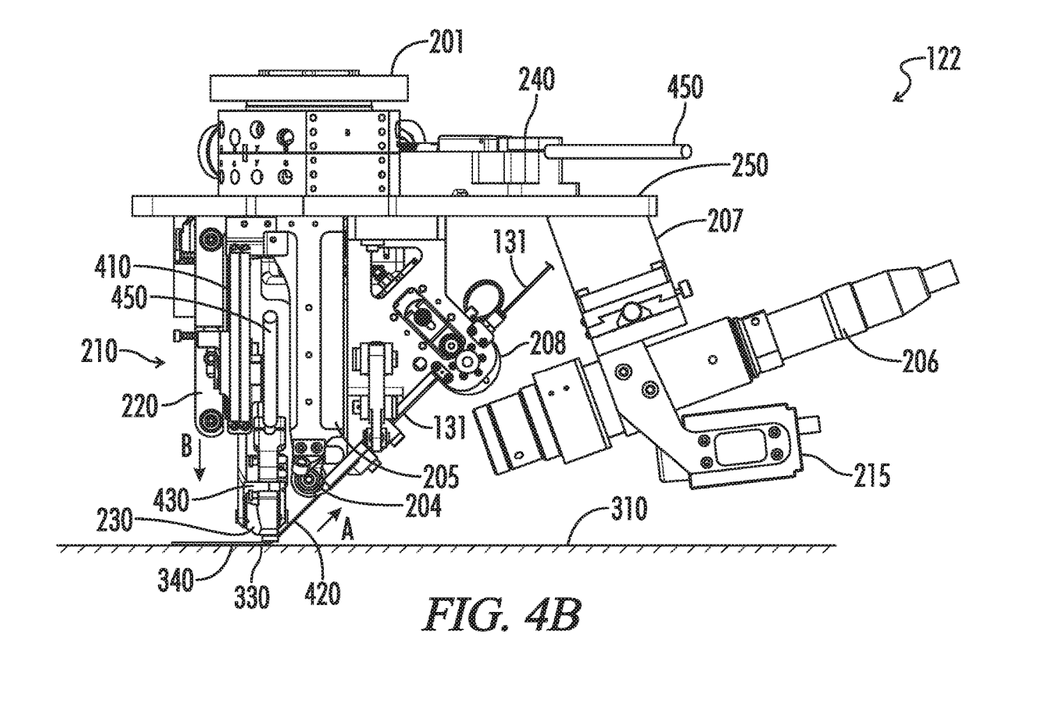

Cutter assembly 210, described in more detail with respect to the following figures, comprises a cutting mechanism that is configured to cut filament 131, as needed and under the control of controller 101. Cutter assembly 210 typically comprises a fixation element 220 for locating the cutter assembly relative to the body 205 and a cutter 230 that moves relative to the fixation element between a first position in which the cutter is further than the applicator from the deposition termination point 330 as shown in FIG. 4A, and a second position in which the cutter is closer than the applicator 204 to the deposition termination point 330 as shown in FIG. 4B. The fixation element 220 may be connected directly to the body 205 or it may be connected to the mount 201 such that it is fixed relative to the body.

The cutter assembly 210 may further comprise an actuator 240 which may also be located on the body 205 or on the mount 201 or extended mount plate 250. The actuator 240 may be under control of the controller 101 and may initiate the actuation of the cutter 230.

The deposition head 122 may further comprise elements for cooling the filament 131 after application by the roller 204 and before cutting with the cutter assembly 210. For example, a nozzle 260 may be arranged to blow air or apply a coolant to the filament 131 after the filament is fixed at the deposition termination point 330.

Figure 3:
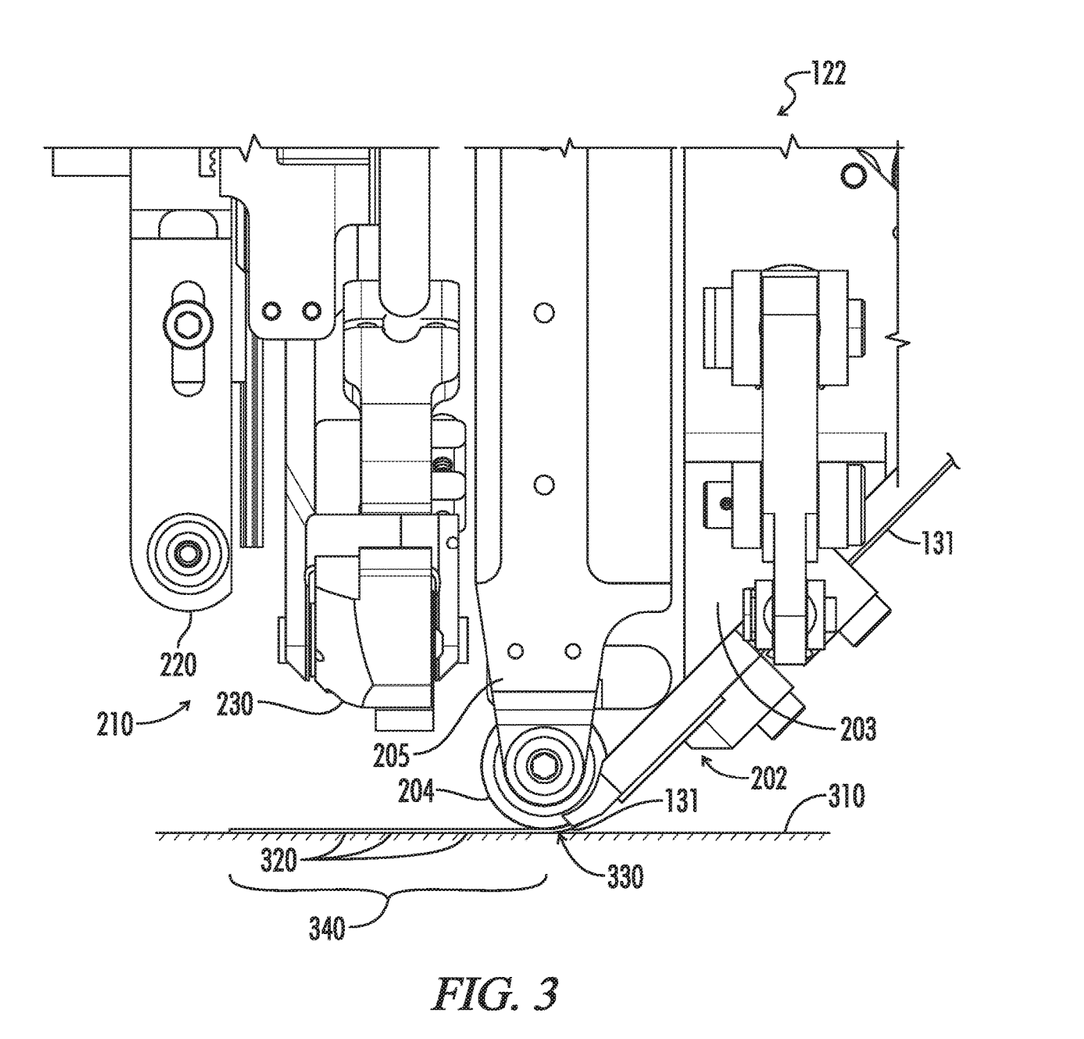
FIG. 3 depicts a lower portion of the deposition head 122 in relation to a surface.

FIG. 3 shows a lower portion of the deposition head 122 as it appears during the process of applying a filament 131 to a surface 310. As discussed above, the surface 310 may be a surface of the platform 111 or object 151 being manufactured. In order to deposit filament 131, roller 204 is configured to apply a pressing force between i) filament 131, when heated, and ii) deposition surface 310. The pressing force is generated via the arm of robot 121 being controlled by controller 101. As shown, the roller 204 presses the filament 131 to a deposition location 340 comprising a sequence of deposition points 320 on the surface 310, eventually reaching deposition termination point 330. For the purposes of this specification, deposition termination point 330, by definition, is always a location on the surface 310 under the roller 204 at the point of deposition upon concluding the fixing of a run of filament 131 to the surface 310 as opposed to being at a fixed point or area on platform 111 or object 151.

The deposition location 340 comprising deposition points 320 and the deposition termination point 330 are part of surface 310, and the fixation of a run of filament 131 proceeds across the deposition location 340 as the roller 204 proceeds along a programmed route. The application ends at a deposition termination point 330 corresponding to the deposition point 320 at which a run of material concludes.

While the surface is shown as a flat surface 320, it will be understood that the surface 310 can be a curved surface, and the run of filament 131 may then follow the curvature of the surface.

Figure 5:
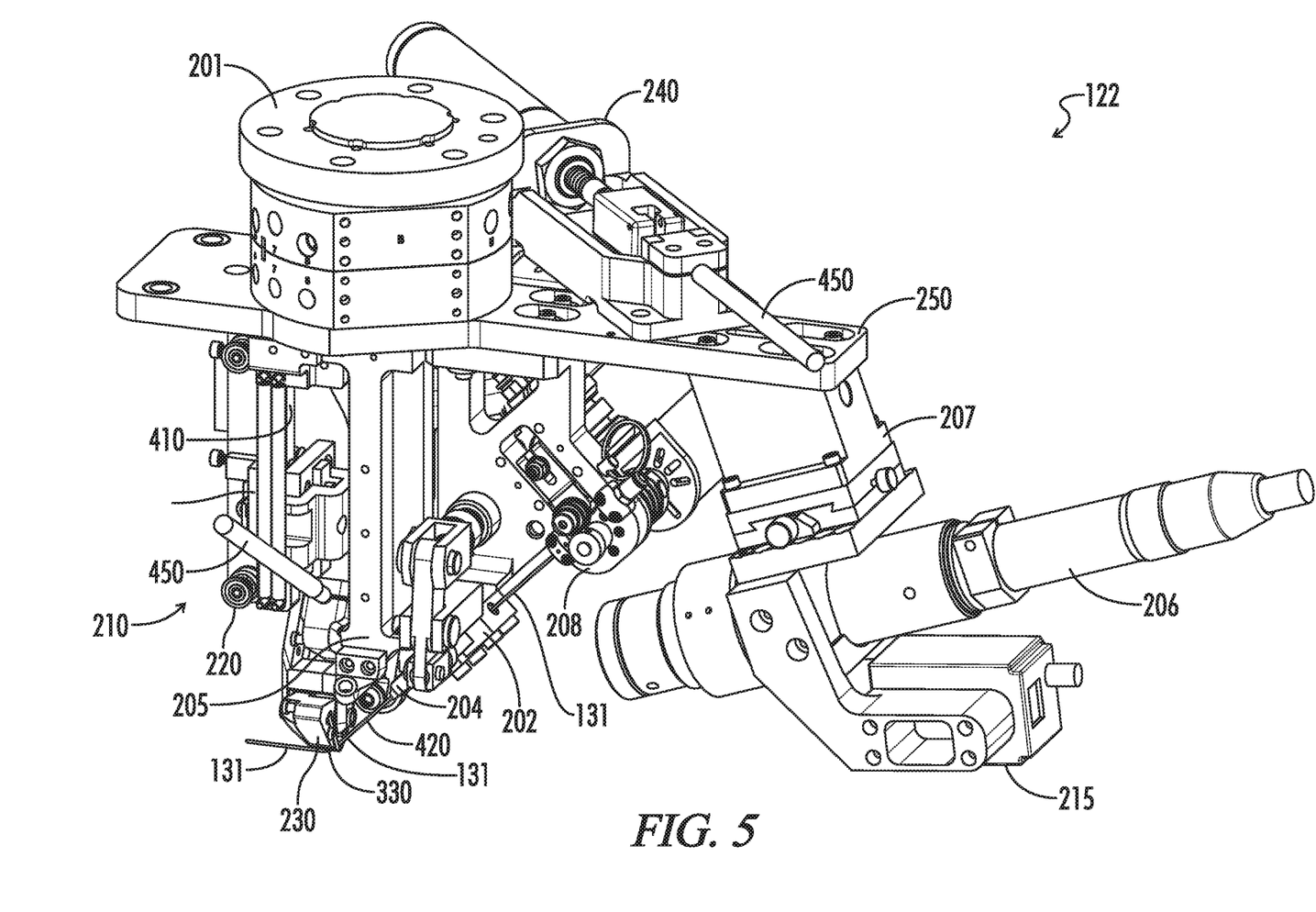
FIG. 5 is a perspective view of the deposition head 122.

FIGS. 4A and 4B depict the deposition head 122 in a first configuration and in a second configuration respectively. FIG. 5 is a perspective view of the deposition head 122.

As shown, the additive manufacturing system 100 has a deposition head 122 having a body 205 and an applicator 204 for fixing a run of filament 131 to a surface 310 at a deposition location 340. The deposition location 340 is made up of a sequence of deposition points 320 ending at a deposition termination point 330. The deposition termination point 330 is directly below the applicator 204 upon conclusion of applying the run of filament 131 to the surface 310.

Fixed to the deposition head 122 is a cutter assembly 210 for cutting the filament 131 after the run of filament is fixed to the surface 310. The cutter assembly 210 comprises a fixation element 220 which fixes the cutter assembly to the deposition head 122. This could be at the body 205, the mount 201, or the extended mount plate 250. Regardless, the fixation element 220 is positioned relative to the deposition head 122, such that whenever the deposition head moves, the fixation element moves with it.

The cutter assembly 210 further comprises a cutter 230 which is movable relative to the fixation element 220. This may be, for example, by translating vertically along a track 410 using a linear bearing provided at the fixation element 220. In alternative embodiments, the cutter 230 may be movable along an angled path or it may swing towards the deposition termination point 330.

As shown, the deposition head 122 has a first configuration, referred to herein as a deposition termination configuration, shown in FIG. 4A. In such a configuration, the cutter 220 is further than the applicator 204 from the deposition termination point 330. In the embodiment shown, the cutter translates relative to the body 205 and the associated applicator 204 along a vertical axis, such that, when considered relative to the deposition termination point 330, the cutter 220 is "above" the applicator. As shown, the cutter assembly 210 may be next to the body 205, such that while the applicator 204 is above the deposition termination point 330 at the conclusion of fixation of the run of filament 131, the cutter 220 may be above a location adjacent the deposition termination point 330.

The deposition head 122 has a second configuration, referred to herein as a cutting configuration, shown in FIG. 4B. When in the cutting configuration, the cutter 220 is closer than the applicator 204 to the deposition termination point 330.

After conclusion of applying the run of filament 131, the deposition head 122 transitions from the deposition termination configuration to the cutting configuration. After such a transition, the cutter 220 is directly above the deposition termination point 330 and cuts the filament 131. The cutter 220 cuts the filament 131 only when the deposition head 122 is in the cutting configuration.

As shown, in transitioning from the deposition termination configuration and the cutter configuration, the deposition head may translate relative to the surface such that the applicator 204 is lifted away from and translated horizontally away from the deposition termination point 230. Further, while moving the applicator away from the deposition termination point, the deposition head 122 may provide an excess filament segment 420 such that the run of filament 131 is not pulled away from the deposition location 340. Accordingly, the applicator 204 may be moved away from the deposition termination point 230 in the direction A while the cutter 220 is lowered along the track 410 in direction B.

The deposition head 122 may be further provided with a nozzle 260 positioned above or near the applicator 204 for cooling the filament 131 after application to surface 310. Accordingly, immediately following application, or while the deposition head 122 is transitioned from the deposition termination configuration to the cutting configuration, air or some other fluid may be applied by the nozzle to the deposition termination point 330 in order to cool the filament 131 prior to cutting. Accordingly, a fluid conduit, such as a hose (not shown), may be connected to the nozzle 260.

The cutter 220 is typically mounted on a sled 430 which moves along the rail 410. The sled 430 may comprise additional components required for cutting the filament 131. For example, the sled 430 may contain an actuator for implementing a cutting action at the cutter 220. In the embodiment shown, an actuator 240 is provided on the mount 201, and the actuator transmits a mechanical actuation force using a Bowden cable 450 (partially shown). As such, the sled 430 locates a cutter end of the Bowden cable 450 relative to the cutter 220.

Once the cutter 220 cuts the filament, the excess filament segment 420 may extend from the deposition head 122. After such a cut, the filament drive 208, or a distinct filament retraction element, may retract the excess filament segment 420 so that it could be used as part of a later run of filament 131.

In use, when depositing a run of filament 131, the filament is heated by the heater 206 just before it is deposited and fixed by the applicator 204. Accordingly, the filament is heated to increase its malleability just prior to placement and, in the embodiment shown, is flattened by the roller while still malleable. However, heating the filament 131 repeatedly may degrade the quality of the filament or may vary the characteristics of the filament. Accordingly, it may be desirable to deactivate the heater 206 while the excess filament segment 420 is being dispensed. This is described in more detail with respect to the method of FIG. 8.

Figure 6:
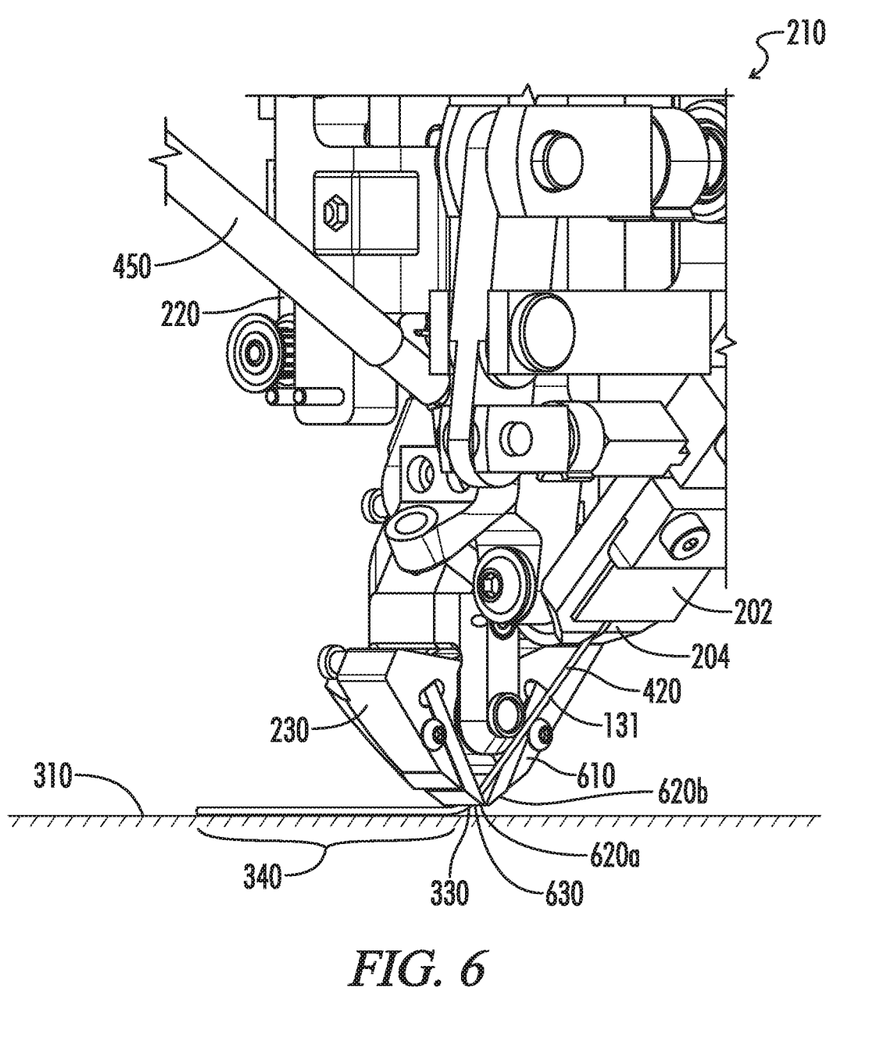
FIG. 6 is an enlarged perspective view of a cutter assembly 110.

FIG. 6 is an enlarged perspective view of a cutter assembly 110 shown while cutting the filament 131. As shown, when the deposition head 122 moves away from the deposition termination point 330 and provides the excess filament segment 420, the excess filament segment is angled such that it follows a path that moves away from the surface 111. Accordingly, the filament 131 lifts away from the surface immediately after the deposition termination point 330 and the excess filament segment 420 connects the deposition head 122 to the deposition termination point 330. In practice, the deposition head feeds the excess filament segment 420 as it moves away from the deposition termination point 330, and from the perspective of the surface 310, the filament remains stationary as the deposition head withdraws.

The cutter 220 may be a hinged clipper 610 with a pair of horizontally arranged blades 620a, b. When in the cutting configuration, the blades 620 are held substantially parallel to the surface 310, such that the blades cut the filament 131 where the filament is pulled away from the surface by the deposition head 122 by way of the excess filament segment 420. It will be understood that while the blades 620 are shown as a pair of blades, they may similarly take the form of a single blade cutting against an anvil or against a surface.

The blades 620 are machine tools made of robust materials. Because the filament 131 may be abrasive, a blade made of a softer metal would wear quickly. The blades 620 may be made, for example, out of tungsten carbide.

In embodiments where the applicator 204 is a roller, such as those shown, the roller compresses the run of filament 131 against the surface 310 at the deposition location 320 ending at the deposition termination point 330. In such an embodiment, the run of filament, after fixation, is flattened to a substantially linear cross section, while the excess filament segment 420 is not flattened and has a substantially circular cross section. As such, there is a transitional segment 630 where the filament transitions from the substantially linear cross section to the substantially circular cross section.

In some embodiments, the transitional segment 630 may be removed from the filament 131 prior to retracting the excess filament segment 420. This may be by implementing two cuts with the clipper 610 or by providing two sets of blades next to each other that simultaneously apply a first cut between the run of filament 131 and the transitional segment 630 and a second cut between the transitional segment 630 and the excess filament segment 420. In some embodiments, the clipper 610 cuts the filament 131 between the run of filament 131 and the transitional segment 630 and the transitional segment is removed by cutting the excess filament segment using a secondary cutter, such as a cutter located inside the deposition head.

Figure 7A:
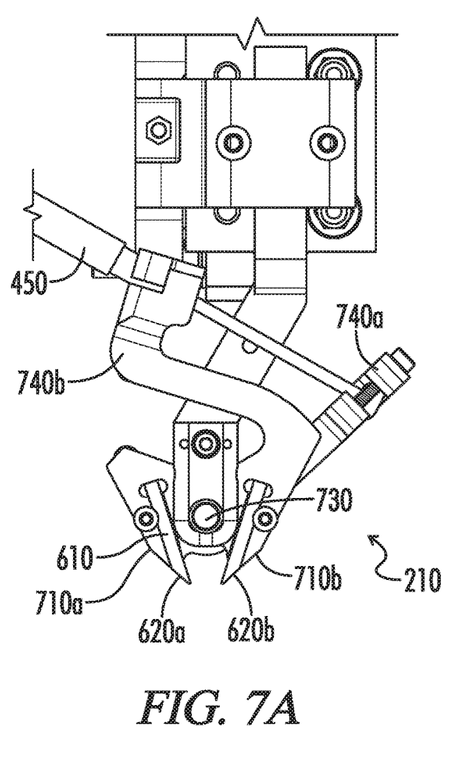
FIGS. 7A and 7B are sectioned front views of the cutter 210 in a first configuration and a second configuration respectively.
Figure 7B:
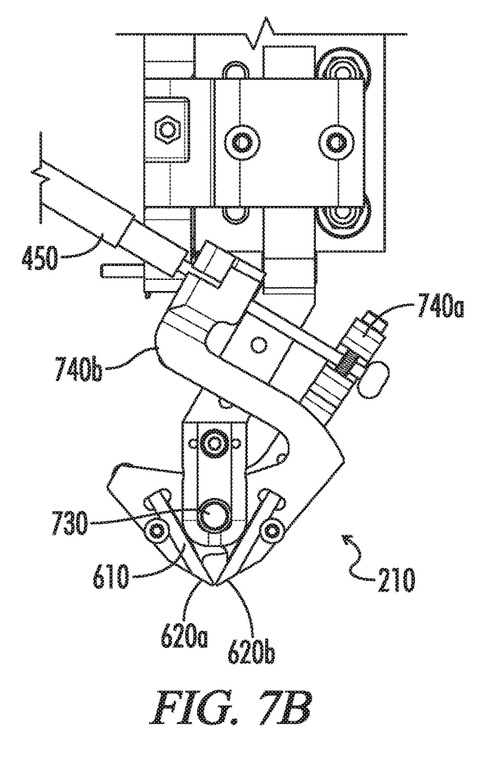

FIGS. 7A and 7B are sectioned front views of the cutter 220 in a first configuration and a second configuration respectively. As shown, and as discussed above, the cutter 220 shown is a hinged clipper 610 with a pair of horizontally arranged blades 620a, b. The blades are arranged at the ends of a first blade support 710a and a second blade support 710b which cross each other at a hinge, such as a pin 730.

The actuator may then link a distal end 740a of the first blade support to a distal end 740b of the second blade support. As shown, this may be by fixing a nipple of a Bowden cable to the distal end 740a of the first blade support 710a and pulling it towards the distal end 740b of the second blade support 710b.

Figure 8:
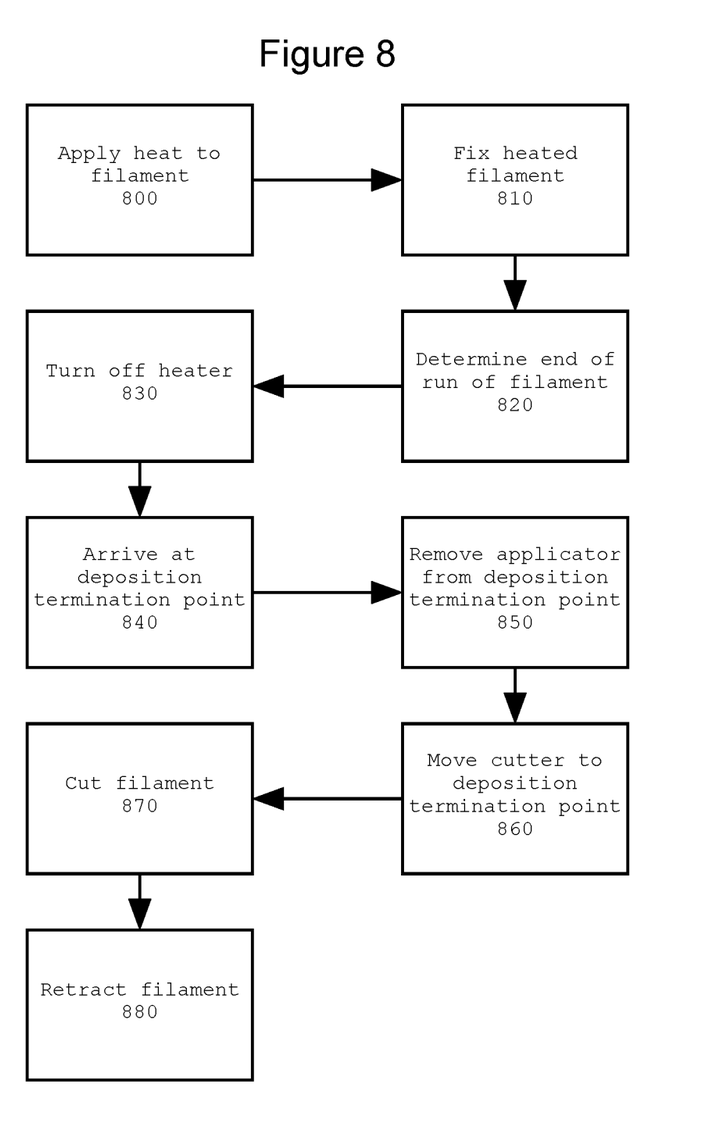
FIG. 8 shows a flowchart for a method for additive manufacturing with a filament 131.

FIG. 8 shows a flowchart for a method for additive manufacturing with a filament 131. The method comprises first applying heat to a portion of a continuously moving filament 131 at a deposition head 122 (800) such that the filament becomes pliable, then fixing the heated filament segment to a surface 310 at a deposition location 340 using an applicator 204 (810). The applicator 204 may be a roller which is then used to apply a pressing force to the filament segment 131 against the surface 310.

The deposition location 340 comprises a sequence of deposition points 320 ending at a deposition termination point 330. Accordingly, the applicator 204 fixes a run of the heated filament to the surface 310 at the deposition location 340 ending at the deposition termination point 330 (840). Upon concluding fixing the run of filament, the applicator 204 is directly above the deposition termination point 330.

A cutter 230 is provided adjacent the deposition head 122 as part of a cutter assembly 210 where the cutter 230 is movable relative to the deposition head. Upon the conclusion of fixing the run of filament 131 to the deposition location, the applicator 204 is moved away from the deposition termination point 330 (850) and the cutter 230 is moved relative to the deposition head 122 and is located at, or directly above, the deposition termination point 330 (860).

The heated filament 131 is then cut at the deposition termination point 330 (870), thereby separating the heated filament segment from an excess filament segment 420. The excess filament segment 420 is then retracted (880) at the deposition head 122 and may be used as part of a second run of filament.

In some embodiments, the filament 131 is cooled prior to cutting with the cutter 220. In such embodiments, a nozzle 260 may be arranged to blow air or apply a coolant to the filament 131 after the filament is fixed but prior to cutting with the cutter 220.

In some embodiments, the run of filament 131 is flattened by a roller when fixed to the deposition location 340, while the excess filament segment 420 is not. The excess filament segment 420 may then have a circular cross section while the run of filament 131 has a substantially linear cross section. There may also be a transitional segment 630 between the run of filament 131 and the excess filament segment 420 at which the cross section transitions from linear to circular. In some embodiments, a second cut may be applied to separate the transitional segment 630 from the excess filament segment 420. Alternatively, the cutter 230 may comprise multiple sets of blades such that it can simultaneously cut the transitional segment 630 from the run of filament 131 and the excess filament segment 420.

Accordingly, the continuously moving filament passes by the heater 206 and is applied as part of the run of filament 131. However, a final portion of filament, namely the excess filament segment 420, passes through the deposition head 122 but is not applied as part of the run, instead being reused later. Accordingly, in some embodiments, the heating element 206 heats the continuously moving filament as it passes through the deposition head at a heating location. The controller 101 then determines when the excess filament segment 420 will arrive at the heating location (820) and deactivates the heating element 206 at that time (830).

In such an embodiment, the heating element is activated prior to fixing the run of heated filament 131 and is deactivated prior to the applicator reaching the deposition termination point 330 such that the heated filament segment is heated and the excess filament segment 420 is not.

While a cutter assembly with a movable cutter is described, in some embodiments, the movable cutter may move in different directions than those shown. For example, the cutter may approach the deposition termination point from an angle upon the conclusion of applying the run of filament.

In some embodiments, after the filament 131 is cut, the deposition head 122 may return to the run of filament and implement a clean-up procedure in which the filament placed on the surface 310 is once again melted and ironed into place.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An apparatus for additive manufacturing with a filament, the apparatus comprising:
a deposition head having i) a body and ii) a roller rotatably coupled to the body and for compressing a run of filament against a surface at a deposition location ending at a deposition termination point, the deposition termination point being adjacent the roller upon conclusion of compressing the run of filament; and
a cutter assembly for cutting the filament after the run of filament is compressed against the surface by the roller, the cutter assembly comprising:
a track for fixing the cutter assembly relative to the deposition head, and
a cutter movable (i) along the track and (ii) relative to the roller;
wherein the deposition head has (i) a deposition termination configuration in which the roller is directly above and adjacent the deposition termination point and (ii) a cutting configuration in which the cutter is (a) directly above and adjacent the deposition termination point and (b) closer than the roller to the deposition termination point, wherein, after conclusion of compressing the run of filament, the deposition head transitions from the deposition termination configuration to the cutting configuration, wherein when the deposition head transitions to the cutting configuration, both the cutter and the roller are translated relative to the deposition termination point, and wherein the cutter is configured to cut the filament only when the deposition head is in the cutting configuration.

2. The apparatus of claim 1, wherein the roller is configured to flatten the filament along a first segment of the filament comprising the run of filament, and wherein a second segment of the filament not flattened as part of the run of filament has a substantially circular cross section upon conclusion of compressing the run of filament.

3. The apparatus of claim 2, wherein the filament has a transitional segment between the first segment of the filament and the second segment of the filament, and wherein the cutter is configured to apply a first cut between the first segment of the filament and the transitional segment, and a second cut between the transitional segment and the second segment, removing the transitional segment from the first segment and the second segment.

4. The apparatus of claim 3, wherein the cutter assembly contains two cutting mechanisms, such that the first and second cuts are made simultaneously.

5. The apparatus of claim 1, the cutter assembly further comprising an actuator, the actuator and the cutter both fixed to a sled movable relative to the track.

6. The apparatus of claim 1, the cutter assembly further comprising an actuator, the actuator connected to the cutter assembly by a Bowden cable.

7. The apparatus of claim 1, the deposition head further comprising a retractor for retracting a portion of the filament not fixed to the surface after the filament is cut.

8. The apparatus of claim 1, wherein the surface is a curved surface, and wherein the deposition location is a line along the curved surface.

9. The apparatus of claim 1, wherein the cutter is a hinged clipper.

10. The apparatus of claim 9, wherein the cutter has at least one blade retained parallel to the surface, wherein a first segment of the filament comprising the run of filament is compressed against the surface, wherein a second segment of the filament extends away from the surface from the deposition termination point to the roller, and wherein the cutter is further configured to cut the filament where the filament is pulled away from the surface between the first segment and the second segment.

11. The apparatus of claim 10, wherein the at least one blade is the only blade of the cutter, and wherein the filament is cut between the one blade and an anvil opposite the blade.

12. The apparatus of claim 1, wherein the track is fixed to the body or a mount for the body.

13. A method for additive manufacturing with a filament, the method comprising:

heating a run of filament at a deposition head, resulting in a run of heated filament, the deposition head having i) a body and ii) a roller rotatably coupled to the body;

compressing, with the roller, the run of heated filament against a surface at a deposition location ending at a deposition termination point, the deposition termination point being adjacent the roller upon conclusion of the compressing of the run of heated filament;

removing the roller from the deposition termination point upon reaching the deposition termination point;

providing a cutter adjacent the deposition head, the cutter being movable relative to the roller;

moving the cutter relative to the roller and locating the cutter directly above and adjacent the deposition termination point, thereby making the cutter closer than the roller to the deposition termination point;

cutting the run of heated filament at the deposition termination point after the run of heated filament is compressed against the surface by the roller, thereby separating a heated filament segment that corresponds to the run of heated filament from a second filament segment; and retracting the second filament segment at the deposition head.

14. The method of claim 13, further comprising cooling the filament after the roller compresses the filament at the deposition termination point and prior to locating the cutter at the deposition termination point.

* * * * *